United States Patent Office 2,727,908
Patented Dec. 20, 1955

2,727,908

16-AMINOMETHYL PREGNENES

Raymond M. Dodson, Park Ridge, Ill., assignor to G. D. Searle & Co., Chicago, Ill., a corporation of Illinois No Drawing. Application August 13, 1954,
Serial No. 449,789

13 Claims. (Cl. 260—397.4)

My invention is concerned with 16-aminoalkyl steroid derivatives and, more particularly, with 16-(α-aminoalkyl)-3-hydroxy-5-pregnen-20-ones and their acyl derivatives.

These compounds can be represented by the general structural formula

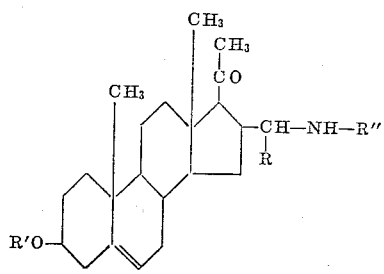

wherein

is a lower alkylene radical and R' and R" are members of the class consisting of hydrogen and lower hydrocarbon-carbonyl radicals containing 1 to 8 carbon atoms.

In the foregoing structural formula R can be hydrogen or a lower alkyl radical such as methyl, ethyl, straight-chained or branched propyl, butyl, amyl, or hexyl. The radicals R' and R" can be hydrogen or lower hydrocarbon-carbonyl radicals derived from such lower hydrocarbon carboxylic acids as formic, acetic, propionic, butyric, valeric, caproic, benzoic, toluic, cyclohexanecarboxylic, cyclohexaneacetic, cyclopentanepropionic acids and the like.

These compounds are of therapeutic value because of their hormonal action, particularly as progesterone inhibitors and as anti-inflammatory agents. The compounds are particularly useful in conditions such as iritis. They are also valuable as intermediates in organic synthesis. Thus oxidation under Oppenauer conditions yields the corresponding 4-pregnene-3,20-dione derivatives which likewise have valuable hormonal activities and act as progesterone inhibitors.

The compounds of my invention are conveniently prepared by the methods indicated in my copending application, Serial No. 362,955, filed June 19, 1953 (now Patent No. 2,697,109). The present application is a continuation-in-part of that application. Treatment of a 3-hydroxy or 3-acyloxy derivative of 5,16-pregnadien-20-one with a lower nitroalkane of the structural formula $$R-CH_2-NO_2$$

in a mild base with an ionization constant greater than $10^{-4}$ yields the 16-(α-nitroalkyl) derivative of the structural formula

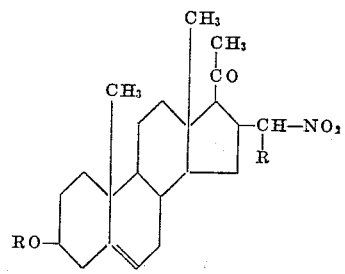

The nitro group is conveniently reduced to an amino group by treatment with iron and an acid such as hydrochloric or acetic acid. Acylation of the 3-hydroxy and of the amino group is accomplished by conventional procedures using the corresponding acid anhydrides and halides.

The compounds which constitute my invention and the methods for their preparation will appear more fully from the consideration of the following examples. However, my invention is not to be construed as limited by the details set forth in spirit or in scope. Quantities of materials are indicated in parts by weight.

Example 1

A mixture of 356 parts of 3-acetoxy-5,16-pregnadien-20-one, 3500 parts of nitromethane and 600 parts of anhydrous piperidine is maintained at room temperature for 5 days, concentrated to a small volume under vacuum and diluted with ether. The resulting solution is washed thoroughly first with dilute potassium hydroxide and then with dilute hydrochloric acid, dried over anhydrous sodium sulfate, filtered and evaporated. Crystallization from a mixture of petroleum ether and benzene using charcoal decolorization yields 3-acetoxy-16-nitromethyl-5-pregnen-20-one melting at about 148–149.5° C. An 0.32% chloroform solution shows a specific rotation of $[\alpha]_D = +5°$.

Example 2

To a solution of 24.3 parts of 3-acetoxy-16-nitromethyl-5-pregnen-20-one in 800 parts of methanol, a solution of 20 parts of potassium hydroxide in 150 parts of water is added. After slight heating to effect solution, the mixture is permitted to stand at room temperature for 5 hours. A small quantity of insoluble material is then removed by filtration and the filtrate is neutralized with acetic acid. The resulting precipitate of 3-hydroxy-16-nitromethyl-5-pregnen-20-one is collected on a filter and recrystallized from acetone. The product melts at about 225–227° C. A 1% chloroform solution shows a specific rotation of $[\alpha]_D = +18°$.

Example 3

A mixture of 21 parts of 3-acetoxy-16-nitromethyl-5-pregnen-20-one, 30 parts of iron filings, 200 parts of acetic acid and 600 parts of water is heated under reflux for 4 hours and then filtered. The ferrous hydroxide and the desired amine are precipitated by addition of ammonium hydroxide. The precipitate is separated by filtration through a silica filter aid, dried and pulverized. The powder is extracted exhaustively with benzene. The benzene solution is filtered and thoroughly extracted with 10% acetic acid. This extract is made alkaline by addition of ammonium hydroxide. The resulting precipitate is collected on a filter, dried in an oven and crystallized from dilute methanol. The 3-acetoxy-16-aminomethyl-5-pregnen-20-one thus obtained melts at about 162–163° C.

with resolidification of the melt. It has the structural formula

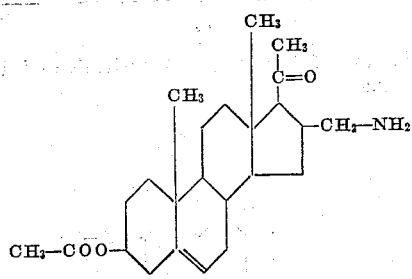

*Example 4*

A solution of 2 parts of 3-acetoxy-16-aminomethyl-5-pregnen-20-one in 80 parts of methanol and 2 parts of potassium hydroxide in 10 parts of water is heated at reflux temperature for 2 hours and then filtered. The filtrate is poured into water and the 3-hydroxy-16-aminomethyl-5-pregnen-20-one is salted out by addition of sodium chloride. After crystallization from a mixture of benzene, ethanol and cyclohexane, and then from highly dilute methanol, crystals are obtained which melt at about 189–191° C. with resolidification. The identical product is obtained by treatment of 3-hydroxy-16-nitromethyl-5-pregnen-20-one with iron and acetic acid by the procedure of the preceding example. The compound has the structural formula

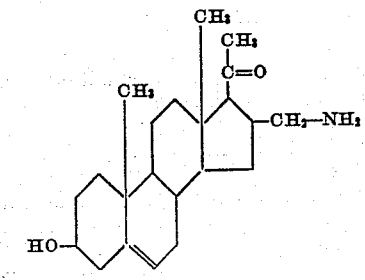

*Example 5*

A solution of 186 parts of 3-acetoxy-16-aminomethyl-5-pregnen-20-one in 1000 parts of pyridine is treated with 1080 parts of acetic anhydride, permitted to stand for 10 hours and then poured into cold water. The resulting precipitate is collected on a filter and crystallized from dilute methanol. The 3-acetoxy-16-acetylaminomethyl-5-pregnen-20-one thus obtained melts at about 167–170° C. It has the structural formula

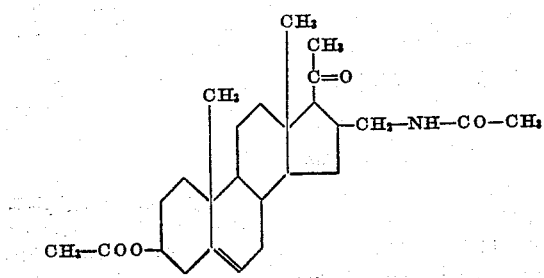

*Example 6*

A solution of 5 parts of 3-acetoxy-16-acetylaminomethyl-5-pregnen-20-one in 200 parts of methanol is treated with a solution of 5 parts of potassium hydroxide in 50 parts of water. After standing for 10 hours at room temperature, the reaction mixture is filtered and the filtrate is neutralized with 5 parts of dilute acetic acid, heated and diluted with water. Upon cooling the 3-hydroxy-16-acetylaminomethyl-5-pregnen-20-one precipitates, which, recrystallized from dilute methanol, melts at about 232–233° C. A 1% chloroform solution shows a specific rotation of $[\alpha]_D = +6°$. The compound has the structural formula

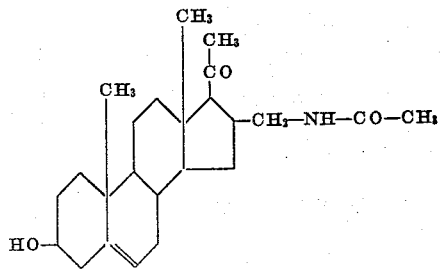

*Example 7*

A solution of 13 parts of cyclohexanecarbonyl chloride and 5 parts of 3-acetoxy-16-aminomethyl-5-pregnen-20-one in 30 parts of pyridine is kept at 25° C. for 30 minutes. The reaction mixture is then poured into cold water whereupon the 3-acetoxy-16-cyclohexanecarboxyl-aminomethyl-5-pregnen-20-one separates as an oil. The compound has the structural formula

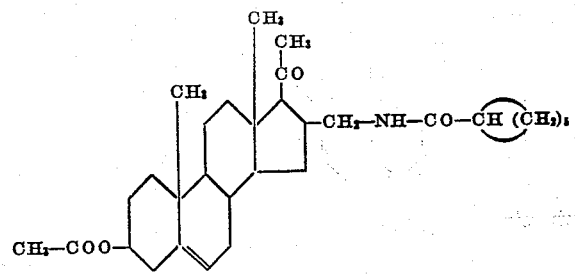

The foregoing reaction mixture is rendered alkaline with 10% sodium hydroxide and the solid precipitate is collected on a filter, washed with water and dissolved in 250 parts of ethanol. Then 5 parts of potassium hydroxide and 15 parts of water are added and, after standing for 4 hours, the mixture is filtered and the filtrate is neutralized with glacial acetic acid. Upon dilution with water a precipitate forms which is collected on a filter and crystallized successively from dilute acetone and then from benzene. The 3-hydroxy-16-cyclohexanecarboxylaminomethyl-5-pregnen-20-one thus obtained melts at about 210–211.5° C. The specific rotation of an 0.6% chloroform solution is +16.7°. The compound has the formula

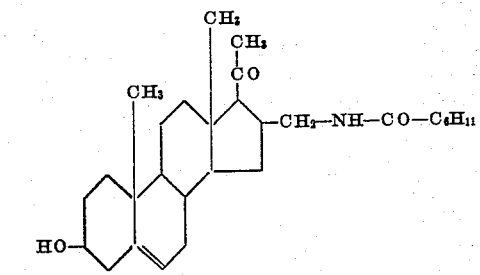

*Example 8*

A mixture of 5.8 parts of 3-acetoxy-16-aminomethyl-5-pregnen-20-one, 30 parts of pyridine and 12 parts of benzoyl chloride is maintained at room temperature for an hour and then poured into 200 parts of ice water. 50 parts of 4-N sodium hydroxide are added and the mixture is allowed to stand for 3 hours with occasional warming and stirring. The 3-acetoxy-16-benzoylaminomethyl-5-pregnen-20-one is collected on a filter and washed with water. The compound has the structural formula

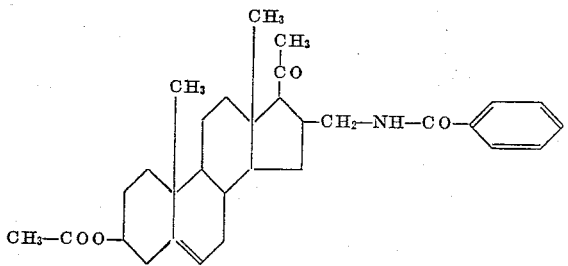

Example 9

The product obtained in the preceding example is stirred with 160 parts of methanol, 240 parts of ethanol and 100 parts of dioxane and treated with a solution of 6 parts of potassium hydroxide in 15 parts of water. Stirring is continued for ten hours after which the suspension is filtered and the filtrate is neutralized with glacial acetic acid. The filtrate is evaporated under vacuum to about one-third of its original volume and then diluted with water until crystallization starts. The precipitate is collected on a filter, dissolved in acetone, stirred with charcoal, filtered and treated with cyclohexane to yield 3-hydroxy-16-benzoylaminomethyl-5-pregnen-20-one which melts at about 178–179.5° C. The ultraviolet absorption spectrum shows a maximum at 227 millimicrons with a molecular extinction coefficient of 10,850. The specific rotation of a 0.341% chloroform solution is +68.9°. The compound has the structural formula

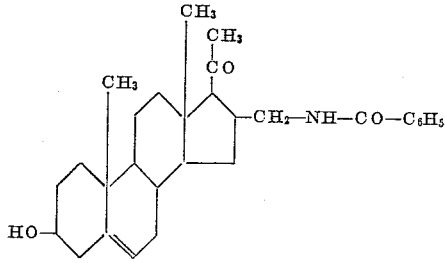

Example 10

A solution of 43 parts of 3-benzoyloxy-5,16-pregnadien-20-one, 500 parts of nitromethane and 200 parts of anhydrous piperidine is maintained at 25° C. for 100 hours, warmed to 50° C. and then evaporated under vacuum to a small volume. The residue is diluted with ether and benzene. This solution is washed thoroughly with dilute potassium hydroxide and then with hydrochloric acid to remove all of the nitromethane and piperidine remaining. The residue is dried over anhydrous sodium sulfate, stirred with decolorizing charcoal, filtered and evaporated to yield the 3-benzoyloxy-16-nitromethyl-5-pregnen-20-one. The compound is readily crystallized from ethyl acetate or acetone. It shows a double melting point; it first melts at about 205–207° C., resolidifies and melts again at about 211–212° C.

A mixture of 47 parts of this compound, 60 parts of iron filings and 1000 parts of water is refluxed for 3 hours. During the first 90 minutes, 260 parts of acetic acid are added portion-wise to control the reaction rate. The mixture is made basic by addition of dilute ammonium hydroxide and the resulting precipitate is removed by filtration through a silica filter aid. The precipitate is dried, pulverized and thoroughly extracted with boiling benzene. The benzene solution is exhaustively extracted with dilute acetic acid and the extract is made alkaline by addition of ammonium hydroxide. The precipitate thus obtained is collected on a filter, dried and crystallized from dilute methanol to yield 3-benzoyloxy-16-aminomethyl-5-pregnen-20-one which has the structural formula

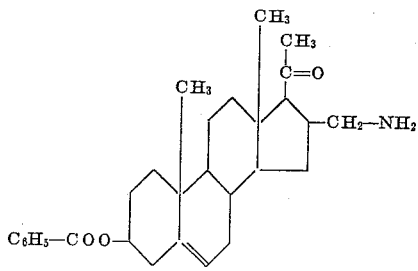

The compound does not melt sharply because of polymerization.

Example 11

A solution of 56 parts of 3-benzoyloxy-16-aminomethyl-5-pregnen-20-one in 400 parts of pyridine is treated with 100 parts of cyclopentaneacetyl chloride. After standing at room temperature for an hour, the reaction mixture is poured into ice wate. The resulting precipitate is collected on a filter and crystallized from dilute methanol. The 3-benzoyloxy-16-cyclopentaneacetylaminomethyl-5-pregnen-20-one thus obtained has the structural formula

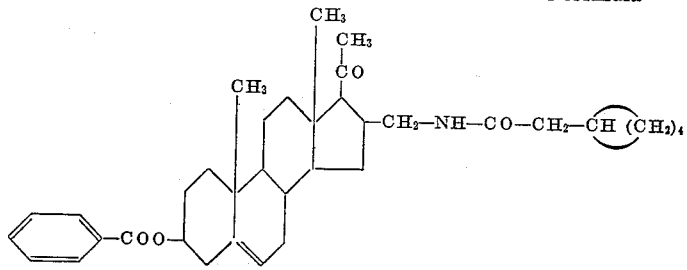

The infrared absorption spectrum shows maxima at 2.89, 6.01 and 6.57 microns in chloroform solution.

Example 12

A mixture of 357 parts of 3-acetoxy-5,16-pregnadien-20-one, 3150 parts of nitroethane and 600 parts of anhydrous piperidine is maintained at room temperature for a week, concentrated under vacuum to a small volume and diluted with ether and a small amount of benzene. The resulting solution is washed successively with dilute potassium hydroxide, water, dilute hydrochloric acid, and again with water, stirred with charcoal, filtered, dried over anhydrous sodium sulfate, again filtered and evaporated. Crystallized from dilute methanol and then from cyclohexane, the 3-acetoxy-16-(α-nitroethyl)-5-pregnen-20-one thus obtained melts at about 156–166° C. The specific rotation of a 1% chloroform solution is +17.5°.

To a solution of 98 parts of this product in 4000 parts of methanol is added a solution of 100 parts of potassium hydroxide in 1000 parts of water. After standing at room temperature for 12 hours, the mixture is filtered and the filtrate is neutralized with acetic acid. The mixture is then heated, diluted with water and cooled and the 3-hydroxy-16-(α-nitroethyl)-5-pregnen-20-one is collected on a filter. The crystals thus obtained melt at about 154–159° C.

A mixture of 37 parts of 3-hydroxy-16-(α-nitroethyl)-5-pregnen-20-one, 60 parts of iron, 260 parts of acetic acid and 1000 parts of water is refluxed for 150 minutes and then filtered. The filtrate is rendered alkaline by addition of ammonium hydroxide and the precipitate is separated by filtration through a silica filter aid. The residue is dried, pulverized and then thoroughly extracted with dilute acetic acid. The extract is rendered alkaline by addition of ammonium hydroxide. The resulting precipitate of 3-hydroxy-16-(α-aminoethyl)-5-pregnen-20-one thus obtained is recrystallized from highly diluted methanol. The compound has the structural formula

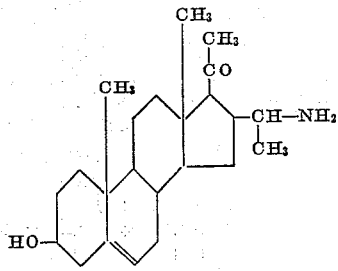

The ultraviolet spectrum shows no appreciable absorption between 222 and 320 millimicrons.

Example 13

A solution of 10 parts of 3-hydroxy-16-(α-aminoethyl)-5-pregnen-20-one in 1000 parts of pyridine and 1000 parts of butyric anhydride is permitted to stand at room temperature for a day and then poured into ice water. The resulting precipitate is collected on a filter and crystallized repeatedly from dilute methanol to yield the 3-butyroxy-16-(α-butyrylaminoethyl)-5-pregnen-20-one in white prisms. The infrared absorption spectrum in chloroform shows maxima at 2.89, 5.80, 5.90, 6.01 and 6.57 microns. The compound has the structural formula

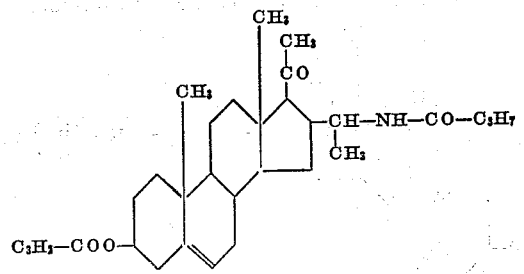

Example 14

A solution of 24.3 parts of 3-hydroxy-16-acetylaminomethyl-5-pregnen-20-one in 865 parts of toluene and 280 parts of cyclohexanone is concentrated to 42% of its original volume and then treated with a solution of 30 parts of aluminum isopropoxide in 130 parts of toluene. After being heated under reflux for one-half hour, the mixture is poured into 1000 parts of a saturated Rochelle salt solution. This solution is then extracted with ethyl acetate and the ethyl acetate extract is washed thoroughly with Rochelle salt solution. The Rochelle salt solutions are once more extracted with ethyl acetate and the organic layers are combined and washed thoroughly with water. Concentration to a small volume and dilution with petroleum ether causes precipitation of 16-acetylaminomethyl-4-pregnene-3,20-dione which, recrystallized from dilute methanol, melts at about 219–220° C.

Example 15

A mixture of 4 parts of 3-hydroxy-16-cyclohexanecarboxylaminomethyl-5-pregnen-20-one, 40 parts of toluene, 30 parts of cyclohexanone and a solution of 3 parts of aluminum isopropoxide in 15 parts of toluene is heated under reflux for 20 minutes, poured into 100 parts of a saturated Rochelle salt solution and steam distilled. The residue is extracted with ethyl acetate. The extract is concentrated and the residue applied in benzene to a chromatography column containing 400 parts of silica gel. The column is washed with benzene and then with benzene solutions containing increasing proportions of ethyl acetate. Elution of the column with a 40% solution of ethyl acetate in benzene and trituration of the resulting eluates with ether causes precipitation of 16-cyclohexanecarboxylaminomethyl-4-pregnene-3,20-dione. On crystallization from dilute acetone, crystals are obtained which melt at about 105–110° C. The specific rotation of a 1.1% chloroform solution is +136°. An ultraviolet absorption maximum is observed at 240 millimicrons with a molecular extinction coefficient of 16,600.

Example 16

An anhydrous solution of 4 parts of 3-hydroxy-16-benzoylaminomethyl-5-pregnen-20-one in 40 parts of toluene and 30 parts of cyclohexanone is treated with a solution of 3 parts of aluminum isopropoxide in 15 parts of toluene and then heated at reflux for 20 minutes. The mixture is then poured into 100 parts of a saturated solution of Rochelle salt and steam-distilled. The residue is cooled and the precipitate collected on a filter. The product thus obtained is repeatedly recrystallized from a mixture of acetone and cyclohexane. Recrystallized from this mixture, the 16-benzoylaminomethyl-4-pregnene-3,20-dione thus obtained melts at about 199–200.5° C. The specific rotation of an 0.7% chloroform solution is +186.7°.

I claim:
1. A compound of the structural formula

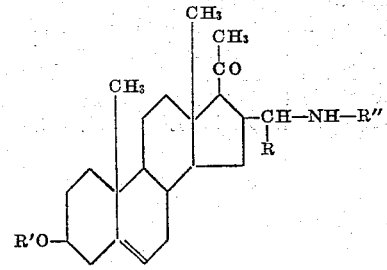

wherein $$-\overset{|}{\underset{R}{C}}H-$$

is a lower alkylene radical and R' and R" are members of the class consisting of hydrogen and lower hydrocarbon-carbonyl radicals containing 1 to 8 carbon atoms.

2. A compound of the structural formula

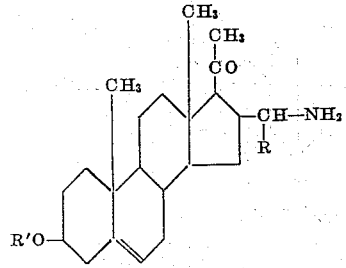

wherein R' is a lower hydrocarbon-carbonyl radical containing 1 to 8 carbon atoms and $$-\overset{|}{\underset{R}{C}}H-$$

is a lower alkylene radical.

3. A compound of the structural formula

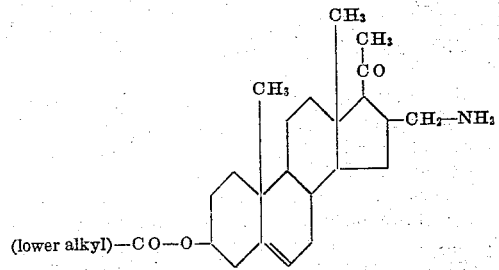

4. 3-acetoxy-16-aminomethyl-5-pregnen-20-one.
5. A compound of the structural formula

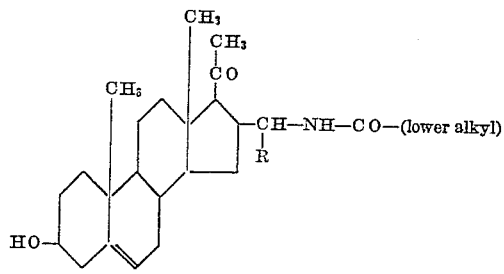

wherein

is a lower alkylene radical.

6. 3-hydroxy-16-acetylaminomethyl-5-pregnen-20-one.
7. A compound of the structural formula

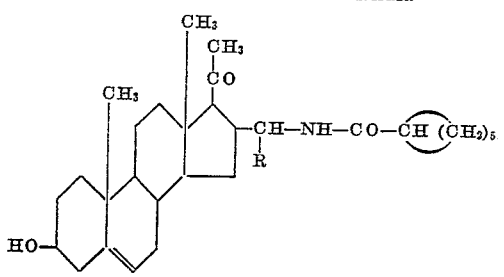

wherein

is a lower alkylene radical.

8. 3 - hydroxy - 16 - cyclohexanecarboxylaminomethyl-5-pregnen-20-one.
9. A compound of the structural formula

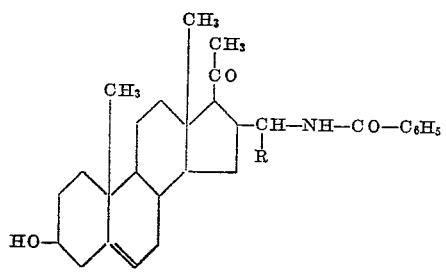

wherein

is a lower alkylene radical.

10. 3 - hydroxy - 16 - benzoylaminomethyl - 5 - pregnen-20-one.
11. A compound of the structural formula

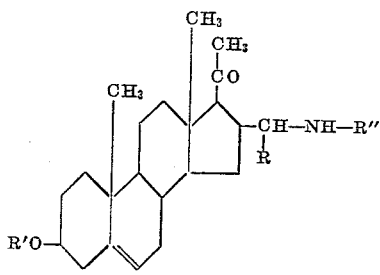

wherein R' and R'' are lower hydrocarbon-carbonyl radicals containing 1 to 8 carbon atoms and

is a lower alkylene radical.

12. A compound of the structural formula

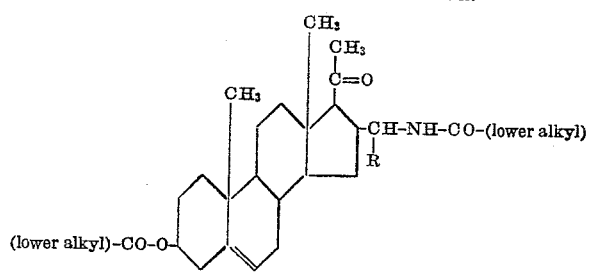

wherein

is a lower alkylene radical.

13. 3 - acetoxy - 16 - acetylaminomethyl - 5 - pregnen-20-one.

References Cited in the file of this patent
UNITED STATES PATENTS

| | | |
|---|---|---|
| 2,562,194 | Julian | July 31, 1951 |
| 2,588,391 | Julian | Mar. 11, 1952 |